(12) United States Patent
Chen et al.

(10) Patent No.: US 12,521,873 B2
(45) Date of Patent: Jan. 13, 2026

(54) SYSTEM AND METHOD FOR AUTOMATICALLY COLLECTING STIRRUP

(71) Applicant: Industrial Technology Research Institute, Hsinchu (TW)

(72) Inventors: Yen-Cheng Chen, Taichung (TW); Jing Bo Chen, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 210 days.

(21) Appl. No.: 18/470,438

(22) Filed: Sep. 20, 2023

(65) Prior Publication Data

US 2024/0189990 A1 Jun. 13, 2024

(30) Foreign Application Priority Data

Dec. 13, 2022 (TW) .................................. 111147718

(51) Int. Cl.
*B25J 9/16* (2006.01)
*B21F 1/00* (2006.01)

(52) U.S. Cl.
CPC ............. *B25J 9/1612* (2013.01); *B25J 9/161* (2013.01)

(58) Field of Classification Search
CPC .................................. B21F 1/00; B21F 11/00
See application file for complete search history.

(56) References Cited

U.S. PATENT DOCUMENTS 9,296,103 B2  3/2016  Iwatake
9,469,035 B2 * 10/2016  Noda ..................... B25J 9/0018
10,913,151 B1  2/2021  Hinkle
11,318,620 B2  5/2022  Wicks et al.
11,565,406 B2 * 1/2023  Yerazunis ................ B25J 15/12
2022/0101558 A1  3/2022  Mahajan et al.

FOREIGN PATENT DOCUMENTS

CN  103817263  5/2014
CN  203638239  6/2014
CN  106426235  2/2017
CN  104217441  5/2017
CN  206263973  6/2017

(Continued)

OTHER PUBLICATIONS

CN108838595 English Machine Translation (Year: 2025).*

(Continued)

*Primary Examiner* — Jason Holloway
*Assistant Examiner* — Atticus A Cameron
(74) *Attorney, Agent, or Firm* — JCIPRNET

(57) ABSTRACT

A system and a method for automatically collecting a stirrup are provided. The system includes a control unit, a stirrup device, and a robotic arm. The control unit receives work order information and automatically generates pickup point and placement point information of the stirrup according to the work order information. The stirrup device is electrically connected to the control unit and receives the work order information output by the control unit to shape the stirrup. The robotic arm is electrically connected to the control unit and receives the pickup point and placement point information, wherein the control unit controls the robotic arm to grab the stirrup from a pickup point and place the stirrup at a placement point.

22 Claims, 8 Drawing Sheets

(56) References Cited

FOREIGN PATENT DOCUMENTS

| | | | | |
|---|---|---|---|---|
| CN | 207026319 | | 2/2018 | |
| CN | 108838595 | * | 11/2018 | |
| CN | 208068298 | | 11/2018 | |
| CN | 109014923 | | 12/2018 | |
| CN | 110883147 | | 3/2020 | |
| CN | 111034358 | | 4/2020 | |
| CN | 111389975 | | 7/2020 | |
| CN | 111687839 | | 9/2020 | |
| CN | 109559341 | | 3/2021 | |
| CN | 111672774 | | 7/2021 | |
| CN | 214560878 | | 11/2021 | |
| CN | 214718532 | | 11/2021 | |
| CN | 112847375 B | * | 4/2022 | ............ B25J 9/1602 |
| CN | 113003033 | | 6/2022 | |
| JP | 2013119142 | | 6/2013 | |
| TW | M360119 | | 7/2009 | |
| TW | I626907 | | 6/2018 | |
| TW | 201945265 | | 12/2019 | |
| TW | I744665 | | 11/2021 | |
| TW | 202213005 | | 4/2022 | |
| TW | I763388 | | 5/2022 | |

OTHER PUBLICATIONS

CN112847375B Machine English Translation (Year: 2025).*
Wenlong Ji et al., "An efficient pose classification method for robotic grasping", Cobot, Mar. 3, 2022, pp. 1-12.
"Office Action of Taiwan Counterpart Application", issued on Jan. 19, 2023, p. 1-p. 12.

* cited by examiner

SYSTEM AND METHOD FOR AUTOMATICALLY COLLECTING STIRRUP

CROSS-REFERENCE TO RELATED APPLICATION

This application claims the priority benefit of Taiwanese application no. 111147718, filed on Dec. 13, 2022. The entirety of the above-mentioned patent application is hereby incorporated by reference herein and made a part of this specification.

TECHNICAL FIELD

The disclosure relates to a system and a method for automatically collecting a stirrup.

BACKGROUND

In the current production of rebar products, a rebar bending machine (stirrup machine) is adopted to produce stirrup products of various shapes and structures by bending rebars. After the stirrup machine bends a stirrup product, the stirrup product is lastly cut to complete the production of one stirrup product. The whole production process takes a few seconds. Although the stirrup machine producing stirrups is highly automated, the resulting products are usually allowed to fall directly and pile up on the ground. After shutdown, the stirrups piled up on the ground are manually sorted, counted, removed, and packed. When the stirrup machine is used to produce stirrup products of different shapes, if the stirrup machine directly processes another specification of stirrups without stopping the machine, stirrup products of different shapes are mixed together.

In order to avoid the issue that the stirrup products formed by the stirrup machine are too messy and entangled if they fall and pile up on the ground, the stirrup products are usually collected manually. Specifically, about 2 to 3 people are needed to work together to move the scattered and piled up stirrup products (hereinafter referred to as stirrups) on the ground, which is a heavy load for the relocation personnel and is high-risk work. Therefore, using a stirrup collecting device or using an industrial robot to collect the stirrup products may reduce labor intensity and improve work quality and efficiency.

At present, when a robot is used to collect stirrups, a clamp is usually connected to the robotic arm, then the stirrups are grabbed and moved, and the stirrups are stacked to a preset position. Stirrups have the characteristic of diverse patterns due to different applications, and various patterns also have different side lengths, so an infinite variety of combinations may be developed.

However, the existing clamps may usually grab stirrups with fixed shapes and specifications, and are not suitable for the grabbing of stirrups having different shapes and different specifications. Moreover, it is also difficult to build a robot grabbing program for stirrups having different shapes and different specifications one by one for each shape. Usually, a limited number of products categories may be automatically put into production in response to products with high demand, and most of the others are still manual operations.

The job assignment of the stirrup machine needs to be stopped first, and the size and angle of the stirrup are entered into the stirrup machine one by one by the on-site personnel. This information is usually delivered via paper, which has issues such as misplacement by personnel and errors in work order delivery. Moreover, for the processing of stirrups of different shapes and sizes in the work order, if some of the stirrups are produced by skipping orders, or after changing materials or orders, it is difficult to recollect the count. Therefore, for the personnel, the work content is relatively complicated. In addition to entering the content of work orders one by one, it is also desired to adjust compensation parameters, grab stirrups, calculate quantities, and determine how various patterns are suitable for stacking and shipping, and stack complex stacked bundles, etc.

Moreover, there are also other complex factors affecting the position error of the pattern pickup of the final output stirrup, such as: oil temperature, weather, wear of conveyor wheel, pattern self-weight, etc.

It may be seen from the above that the automatic production management of stirrups is an urgent issue to be solved at present.

SUMMARY

An embodiment of the disclosure provides a system for automatically collecting a stirrup which includes a control unit, a stirrup device, and a robotic arm. The control unit receives work order information and automatically generates pickup point and placement point information of the stirrup according to the work order information. The stirrup device is electrically connected to the control unit and receives the work order information output by the control unit to shape the stirrup. The robotic arm is electrically connected to the control unit and receives the pickup point and placement point information, wherein the control unit controls the robotic arm to grab the stirrup from a pickup point and place the stirrup at a placement point.

An embodiment of the disclosure provides a method for automatically collecting a stirrup which at least includes the following steps: entering work order information configured to produce the stirrup; calculating a line center and a pattern center of gravity in the pattern of the stirrup according to the work order information to obtain a pickup point; obtaining a placement point; and grabbing the stirrup from the pickup point and placing the stirrup at the placement point obtained based on the work order information via a robotic arm.

Several exemplary embodiments accompanied with figures are described in detail below to further describe the disclosure in details.

BRIEF DESCRIPTION OF THE DRAWINGS

The accompanying drawings are included to provide a further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

A system for automatically collecting a stirrup of the disclosure is used in the production of stirrups, and a control unit thereof may receive the manufacturing requirements from an upper control system, and automatically assign the content of work order information to a stirrup machine, automatically generate corresponding positions of a pickup point and a placement point, and control a robotic arm to perform stirrup collecting, sorting and stacking operations.

The system for automatically collecting the stirrup of the disclosure may also calculate automatically to generate the corresponding positions of the pickup point and the placement point of the robotic arm. In this way, without the need to program each shape and length individually, the system for automatically collecting the stirrup may be adapted to the automatic production of stirrups having different patterns with continuously variable sizes within a predetermined size range.

The system for automatically collecting the stirrup of the disclosure may also automatically calculate the process flow corresponding to the pickup point, and find the pickup point close to the pattern center of gravity or the line center of the stirrups via pattern fitting.

The system for automatically collecting the stirrup of the disclosure may also calculate automatically to give priority to the solution that a plurality of grippers may grab at the same time when the patterns are fitted; and if the solution of simultaneous grabbing by the plurality of grippers may not be obtained, whether a solution of grabbing with fewer grippers may be used is determined.

The system for automatically collecting the stirrup of the disclosure may automatically calculate and generate the corresponding pickup point and placement point, and when it is determined that the stirrup may not be placed smoothly after grabbing, the pickup point is updated to be correspond to the placement point via compensation feedback.

The system for automatically collecting the stirrup of the disclosure has the function of automatically adjusting the spacing between the plurality of grippers, so that when at least one of the plurality of grippers is driven to grab but interference occurs resulted from the configuration of the plurality of grippers of the robotic arm, the position of at least one of the plurality of grippers may be changed via a moving device to avoid interference.

The system for automatically collecting the stirrup and the method for automatically collecting the stirrup using the system for automatically collecting the stirrup of the disclosure are described below with illustrations.

Figure 1:
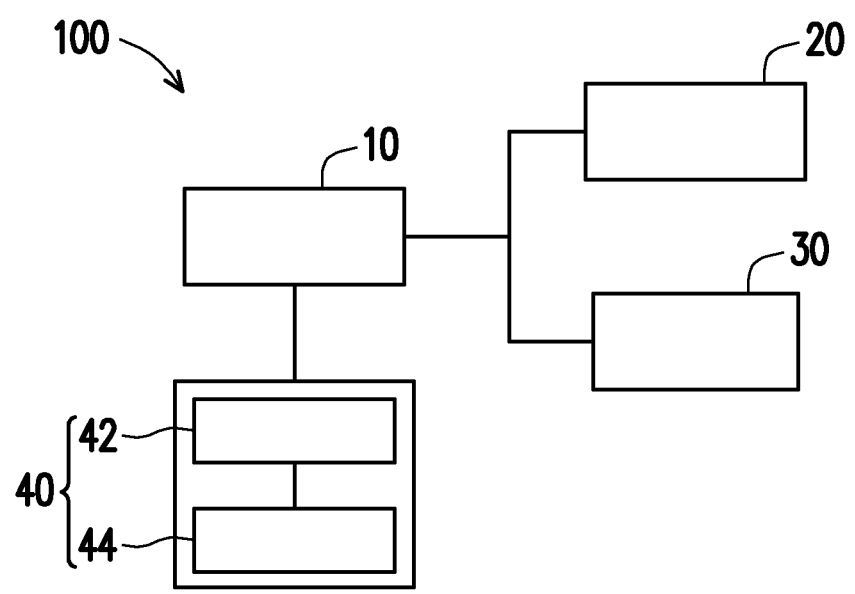
FIG. 1 is a schematic diagram of a system for automatically collecting a stirrup according to an embodiment of the disclosure.

FIG. 1 is a schematic diagram of a system for automatically collecting a stirrup according to an embodiment of the disclosure. Please refer to FIG. 1, a system 100 for automatically collecting a stirrup of the present embodiment is used to automatically produce a stirrup 200 (shown in FIG. 4) and perform collecting, sorting, and stacking operations on the produced stirrup 200.

The system 100 for automatically collecting the stirrup includes a control unit 10, a stirrup device 20, and a robotic arm 30, wherein the control unit 10 is electrically connected to the stirrup device 20 and the robotic arm 30. The control unit 10 is configured to receive work order information and automatically generate pickup point and placement point information of the stirrup 200 according to the work order information. The stirrup device 20 receives the work order information output by the control unit 10 to shape the stirrup 200. Here, the raw material of the stirrup 200 is a rebar. The robotic arm 30 receives the pickup point and placement point information output from the control unit 10 and is controlled by the control unit 10 to grab the stirrup 200 from a pickup point and place the stirrup 200 at a placement point.

The control unit 10 has calculation, communication, and control functions. The control unit 10 communicates and controls the robotic arm 30 and the stirrup device 20, and automatically calculates the corresponding positions of the pickup point and the placement point of the stirrups 200 for the robotic arm 30 to grab according to the content of the work order information, the size of grippers 34 and 36 (shown in FIG. 2A and FIG. 2B) of the robotic arm 30, and the size of the placement area.

The control unit 10 may also intervene to control the action of the stirrup device 20, so as to suspend/continue the control programs of the stirrups and the cutting knife of the stirrup device 20. This function makes the system 100 for automatically collecting the stirrup not limited to be applied to the traditional or networked stirrup device 20, so that the robotic arm 30 may exchange information with the stirrup device 20 via the control unit 10. For example, current quantity, start, completion, abnormal code, etc. are reported in real time, so that the stirrup collecting operation performed by the robotic arm may run smoothly, correctly, and reliably.

The control unit 10 is a computer, and the operator may enter the work order information into the control unit 10 via an input/output interface, such as a mouse, a keypad, a touch screen, and the like.

The stirrup device 20 is used to bend and cut the rebar to form the stirrup 200 according to the work order information entered into the control unit 10.

Figure 2A:
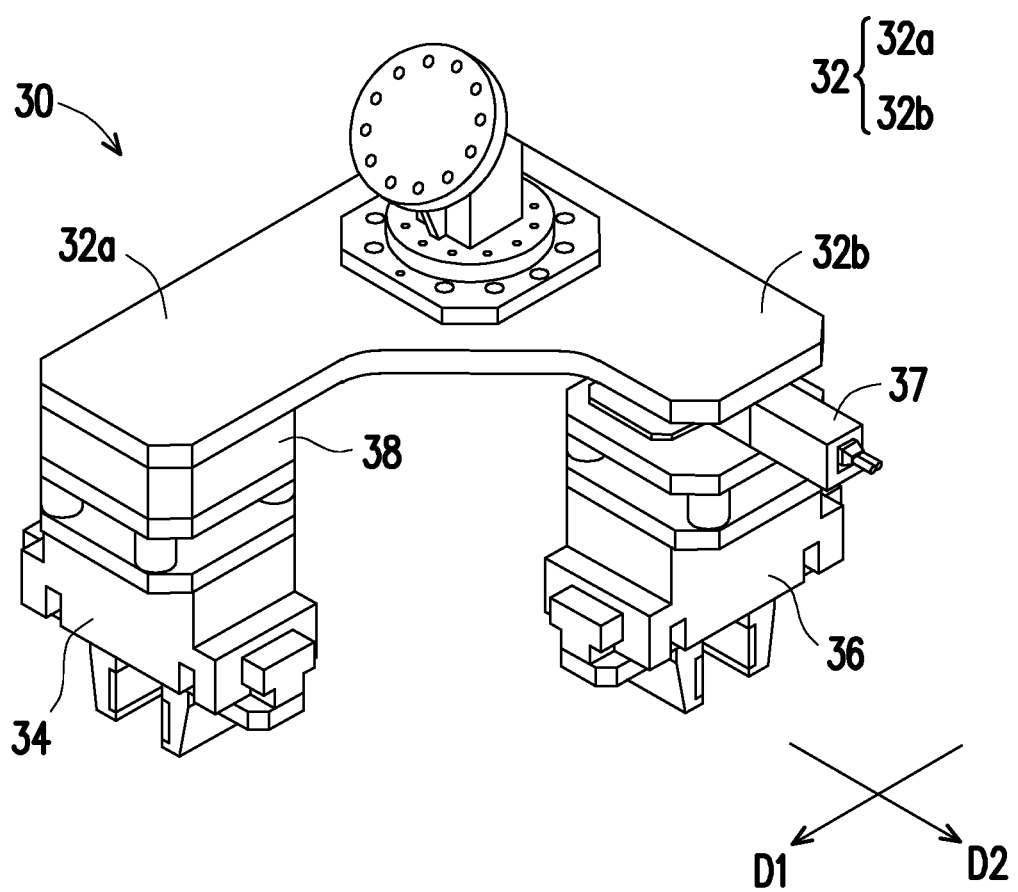
FIG. 2A and FIG. 2B are schematic diagrams of different viewing angles of a robotic arm.
Figure 2B:
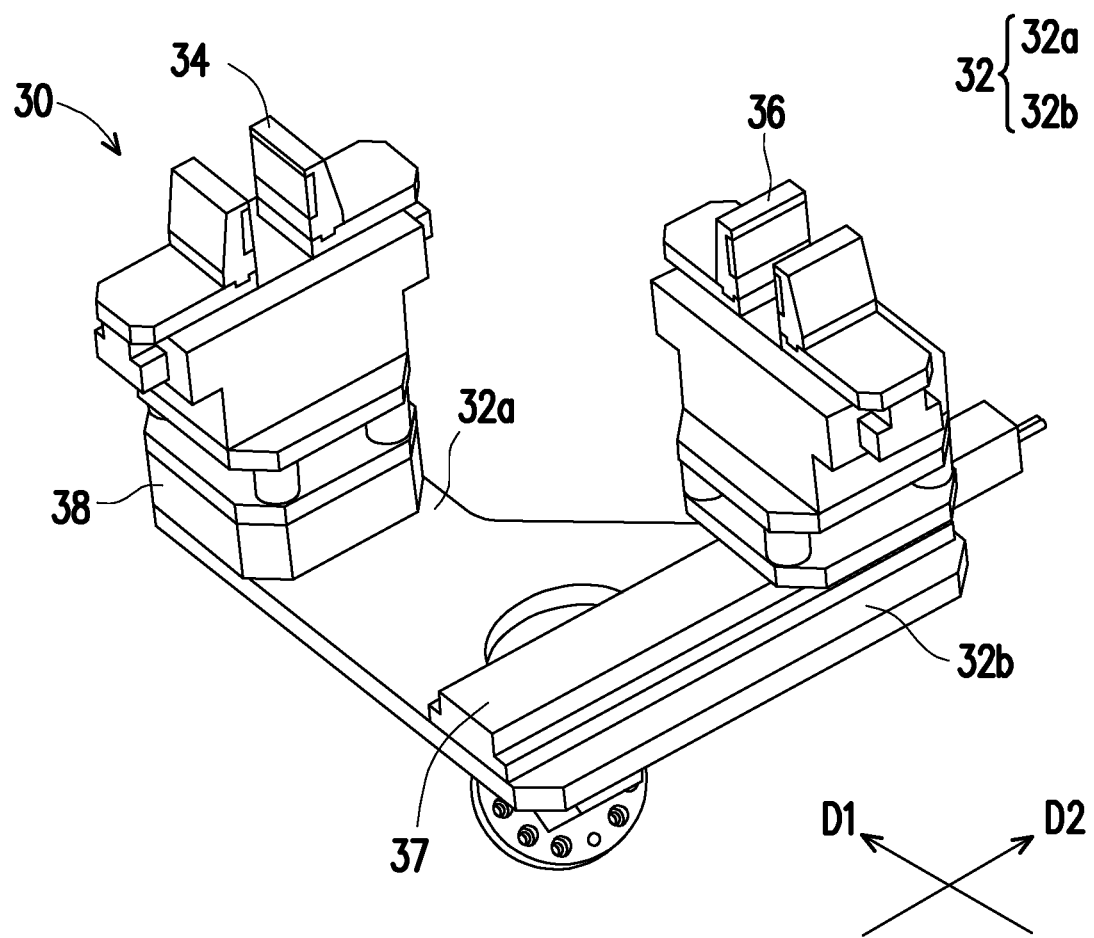

FIG. 2A and FIG. 2B are schematic diagrams of different viewing angles of a robotic arm. Please refer to FIG. 2A and FIG. 2B at the same time, the robotic arm 30 includes a gripper fixing plate 32 and the grippers 34 and 36. The gripper fixing plate 32 may be mounted on a robot (not shown), and the robot may walk freely on a construction site or move according to a planned itinerary.

The gripper fixing plate 32 has a first extending end 32*a* extended toward a first direction D1 and a second extending end 32*b* extended toward a second direction D2, wherein the first direction D1 and the second direction D2 are not parallel to each other. In the embodiment, the first direction D1 and the second direction D2 are substantially perpendicular; that is, the gripper fixing plate 32 is substantially L-shaped. The gripper 34 is disposed at the first extending end 32*a*, and the gripper 36 is disposed at the second extending end 32*b*.

Figure 3:
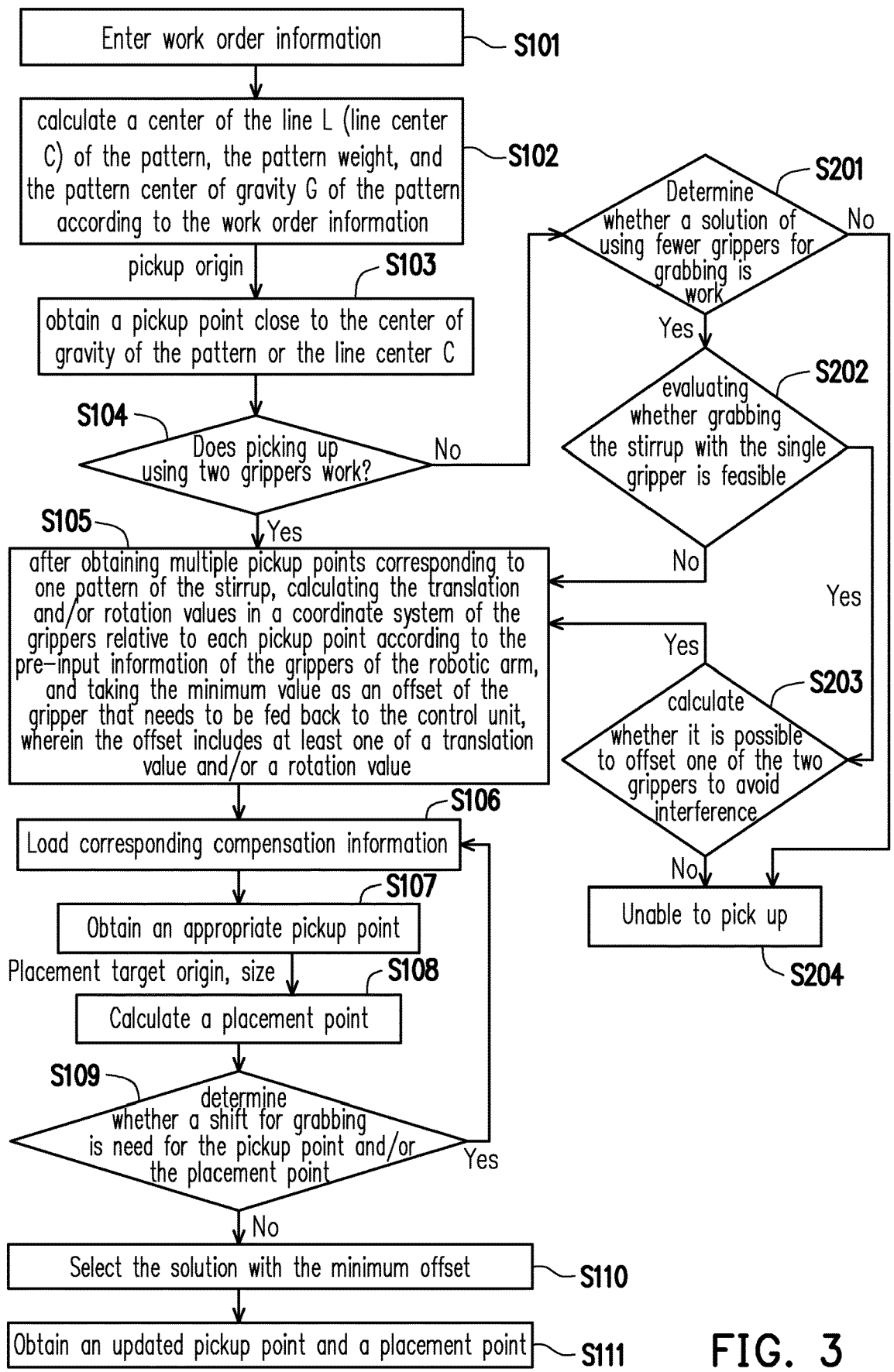
FIG. 3 is a flowchart of the steps of a method for automatically collecting a stirrup using the above system for automatically collecting a stirrup.

FIG. 3 is a flowchart of the steps of a method for automatically collecting a stirrup using the above system for automatically collecting the stirrup. Please refer to FIG. 1, FIG. 2B, and FIG. 3 at the same time. When the system 100 for automatically collecting the stirrup is used, as in step S101, the work order information is manually entered into the control unit 10. The work order information may include the pattern of the stirrup 200, the length, angle, size, and quantity of each of a plurality of segments L1, L2, L3 and L4 or a single segment that defines the pattern of the stirrup 200 (shown in FIG. 4), but is not limited to the given examples. The plurality of the segments or a single segment defines a line L of the pattern of the stirrup 200, wherein the total length of all segments is the length of the line L.

After the work order information is entered into the control unit 10, in step S102, the control unit 10 uses an algorithm to calculate a center of the line L (shown in FIG. 4) (line center C hereinafter) of the pattern, the pattern weight, and the pattern center of gravity G of the pattern according to the work order information.

In addition, during or after step S102, the specifications of the robotic arm 30 may be further entered into the control unit 10. The specifications of the robotic arm 30 include at least the configuration and size of the two grippers 34 and 36, the rotatable angle of the grippers 34 and 36, the movable distance of the grippers 34 and 36, and so on. It is also noted that, although the robotic arm 30 of the present embodiment is described as having the two grippers 34 and 36 as an example, it is not limited thereto. Under proper adjustment of the setting architecture, the grippers 34 and 36 of the robotic arm 30 may also be one, or more than two.

Then in step S103, the control unit 10 calculates to obtain a pickup point close to the center of gravity of the pattern or the line center C.

Figure 4:
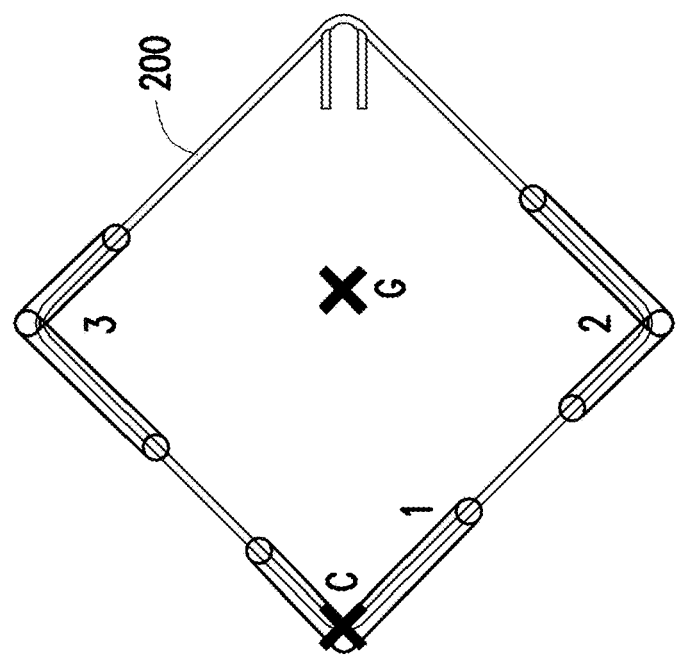
FIG. 4 is a schematic diagram of a stirrup pattern, a configuration of the grippers, and the points where the grippers are suitable for clamping a stirrup.
Figure 4:
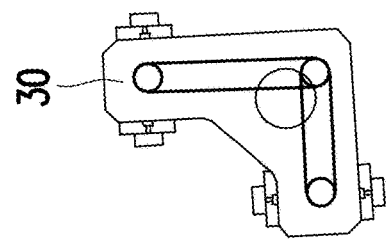
Figure 4:
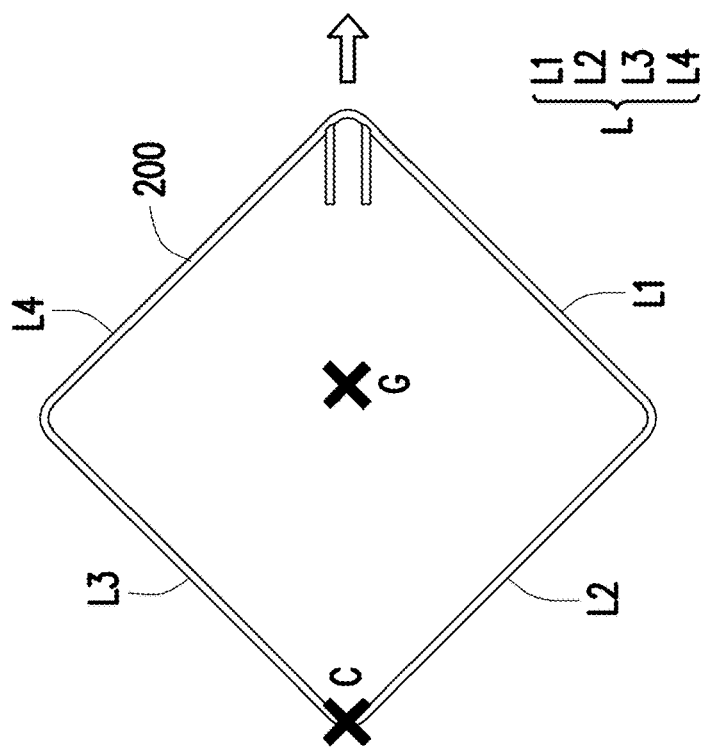

FIG. 4 is a schematic diagram of a stirrup pattern, a configuration of the grippers, and the points where the grippers are suitable for clamping the stirrup. Please refer to FIG. 3 and FIG. 4 at the same time. According to the work order information, the control unit 10 obtains the length and angle of each of the plurality of the segments of the pattern, and automatically calculates the line center of the pattern, the pattern center of gravity, and the pattern weight appearing in the entire rebar. For example, if the pattern is a square, the control unit 10 calculates that a line center C of the pattern is located at the bend of the stirrup 200, and a pattern center of gravity G is within the pattern formed by the stirrup 200, and the pattern has no overlapped portions. The control unit 10 obtains the pickup point by evaluating whether to grab the stirrup 200 close to the line center C of the stirrup 200 or close to the pattern center of gravity G of the stirrup 200 according to a configuration of the robotic arm 30. In this embodiment, the pickup point is found via pattern fitting based on the pre-input gripper size, gripper structure, gripper geometry, and pickup origin in the system for automatically collecting the stirrup, but the present disclosure is not limited thereto.

Specifically, the control unit 10 comprehensively considers comprehensive factors such as the position of the line center C of the pattern of the stirrup 200, the position of the pattern center of gravity G, and the configuration and size of the grippers 34 and 36 of the robotic arm 30, etc., then determines clampable points 1, 2, and 3 of the stirrup 200 shown in FIG. 4, wherein the clampable point 1 is closest to the line center C of the pattern, and the clampable points 2 and 3 are close to the pattern center of gravity G.

As in step S104, whether picking up with two grippers works is determined, that is, whether the two grippers 34 and 36 may be used for grabbing at the same time. It should be noted that, when fitting the pattern, priority should be given to the solution that a plurality of grippers may grab at the same time. This is because using the plurality of grippers for simultaneous grabbing may deliver more stable than using a single gripper for grabbing. Therefore, in the present embodiment, the solution that the two grippers 34 and 36 may grab simultaneously is adopted.

Accordingly, after the control unit 10 obtains the clampable points 1, 2, and 3, and grabbing using two grippers is taken as a priority consideration, the control unit 10 calculates the possibility of using the clampable point 1. If not suitable, a second solution (the clampable point 2 or 3), a third solution . . . , etc. is found. Next, as in step S105, the pickup point having the minimum absolute angle of rotation and/or the minimum linear movement calculated from the original posture of the gripper is given priority. In detail, after obtaining multiple pickup points corresponding to one pattern of the stirrup 200, calculating the translation and/or rotation values in a coordinate system of the grippers relative to each pickup point according to the pre-input information of the grippers 34 and 36 of the robotic arm 30, and taking the minimum value as an offset of the gripper that needs to be fed back to the control unit 10, wherein the offset includes at least one of a translation value and/or a rotation value. For example, the control unit 10 calculates that the clampable point 2 needs to be rotated about (+)45 degrees, and the clampable points 1 and 3 need to be rotated about (+)135 degrees and (−)135 degrees respectively; therefore, the decision to select the clampable point 2 is lastly obtained.

It is also noted that, after obtaining the offset of the grippers 34 and 36, a minimum offset between the offsets is selected, then a solution of using fewer grippers for grabbing is determined, as in step S201. At this point, whether the pattern weight or an interference between the pattern and the grippers is suitable for the solution of grabbing with fewer grippers may also be considered.

In the present embodiment, though the two grippers 34 and 36 are provided, a single gripper 34 or 36 is taken for the solution of fewer grippers when grabbing. In addition, whether the other gripper that does not operate causes interference when grabbing with a single gripper also needs to be considered.

The interference referred to here may come from other segments L1, L2, L3 or L4 of the pattern, cutting points, raised points, and other machine pickup surface features (pre-stored in the system); if there is interference during the single-gripper grabbing solution, determining whether shifting the gripper will avoid interference, obtaining an interfering pickup point, and an offset is added to the interfering pickup point as a new pickup point that avoiding interference caused by the gripper without operating. If the pickup point still may not be found after adding the offset, it is considered as no solution.

The following figures are used for further explanation.

Figure 5:
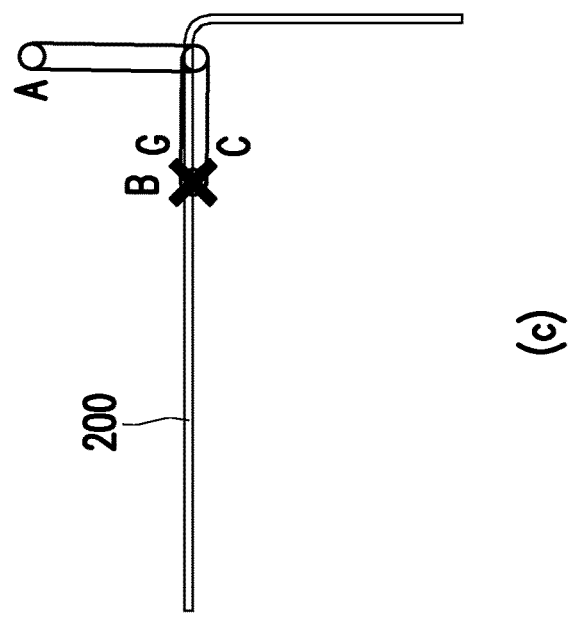
FIG. 5 is a schematic diagram of a gripper and another stirrup pattern according to another embodiment of the disclosure.
Figure 5:
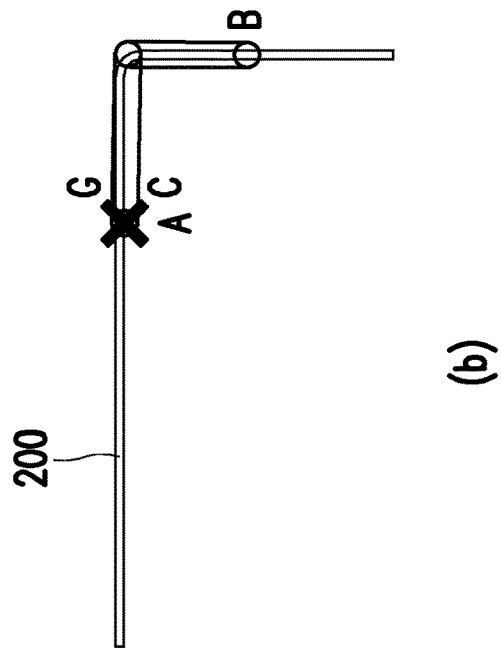
Figure 5:
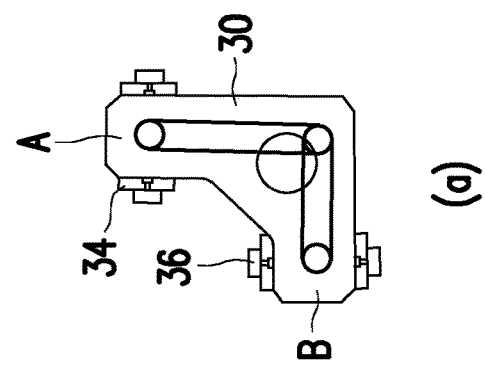

FIG. 5 is a schematic diagram of the grippers and another stirrup pattern according to another embodiment of the disclosure. Please refer to FIG. 2, FIG. 3, and FIG. 5 at the same time. The control unit 10 may further calculate whether the pattern weight is suitable for the situation of picking up with fewer grippers. If the pattern weight is applicable to the solution of picking up with fewer grippers, the solution of the combination of grabbing using a single gripper and grabbing using dual grippers to calculate the minimum absolute offset of the rotation angle and/or the linear movement of the grippers from the pickup origin may be evaluated. When the pattern weight may be grabbed using a single gripper and grabbing using a single gripper is with the minimum absolute offset, the solution of using a single gripper to pick up may be adopted.

Specifically, as shown in (a) of FIG. 5, the gripper 34 defines point A, and the gripper 36 defines point B. As shown in (b) and (c) of FIG. 5, the pattern of the stirrup 200 is L-shaped. As shown in (b) of FIG. 5, when using the dual grippers 34 and 36 for grabbing the stirrup 200 as one solution, the robotic arm 30 needs to be rotated 90 degrees counterclockwise, so that the configuration of the grippers 34 and 36 fits the pattern of the stirrup 200, and the grippers 34 and 36 simultaneous grab the stirrup 200. However, as shown in (c) of FIG. 5, when using a single gripper 36 for grabbing the stirrup 200 as another solution, the stirrup 200 may be directly grabbed using the gripper 36 under the condition that the robotic arm 30 does not rotate, and the gripper 34 does not operate at this moment. Supplementary note that, in the situation that both the solutions of using the two grippers for grabbing or using one single gripper for grabbing are suitable for the present pattern of the stirrup 200, the solution with the minimum offset is selected.

Figure 6:
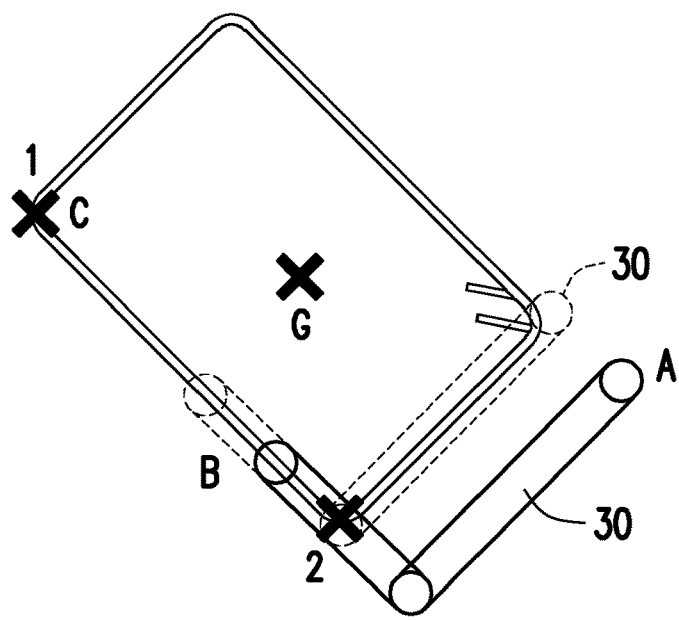
FIG. 6 is a schematic diagram of grabbing a stirrup using the gripper at point B.

It should be noted that, as in step S202, when a single gripper is used to grab the stirrup 200, it needs to be determined that the configuration of the robotic arm 30 and the pattern of the stirrup 200 do not interfere with each other and affect the grabbing. FIG. 6 is a schematic diagram of grabbing a stirrup using the gripper 36 at point B. Please refer to FIG. 2, FIG. 3, and FIG. 6 at the same time. Specifically, when the control unit 10 determines that the clampable point 2 close to the pattern center of gravity G is selected as the pickup point and the gripper 36 at point B is used to grab the stirrup 200 via the calculation of the control unit 10, the gripper 34 located at point A is in contact and interferes with another end of the stirrup 200 that is not grabbed. Therefore, as in step S203, the control unit 10 further calculates whether it is possible to offset one of the two grippers 34 and 36 to avoid interference. In detail, in FIG. 6, the pattern has two pickup points 1 (close to the line center C) and 2 (close to the pattern center of gravity G). However, segment interference happened at the pickup point 2, and therefore evaluating if grabbing the pickup point 2 with single gripper is feasible. Furthermore, since the offset of using single gripper for grabbing the pickup point 2 is less than that of using two grippers for grabbing the pickup point 2, the solution of using one single gripper is selected.

When the calculation result is that one of the offsetting grippers 34 and 36 still may not avoid the interference, as in step S204, the robotic arm 30 may not pick up, and the pickup process is terminated and the result is reported to an output unit (not shown). The output unit may be a display screen or a buzzer electrically connected to the control unit 10, wherein the display screen may display a warning image, and the buzzer may emit an alarm sound.

When the calculation result is to shift one of the two grippers 34 and 36 to avoid interference, the control unit 10 can further drive a linear moving mechanism 37 to move one of the two grippers 34 and 36 to increase the distance between the two grippers 34 and 36 to avoid interference.

In the present embodiment, the linear moving mechanism 37 is connected between the gripper fixing plate 32 and the gripper 36, and the control unit 10 drives the linear moving mechanism 37 to move the gripper 36 connected to the linear moving mechanism 37 towards the second direction D2 for an appropriate distance, so that the distance between the grippers 34 and 36 is increased, thereby avoiding the possibility of the gripper 34 interfering with the stirrup 200 during the grabbing process of the gripper 36.

It is also noted that, although the above illustrates the use of the linear moving mechanism 37 to avoid interference, similarly, by using the rotary mechanism 38 or the linear moving mechanism 37 in conjunction with the rotary mechanism 38, the effect of avoiding interference may also be achieved. Although only one rotary mechanism 38 is shown in FIG. 2B, it is not limited thereto. The gripper 36 also may be rotatably arranged on the gripper fixing plate 32 via the rotary mechanism 38. In addition, the gripper 34 may also be linearly arranged on the gripper fixing plate 32 via the linear moving mechanism 37. In simply, a number of the rotary mechanism 38 or the linear moving mechanism 37 is one or more according to actual requirement.

Then, step S105 is repeated to calculate whether the gripper 36 needs to be rotated or shifted to adapt to the pattern of the stirrup 200, and the stirrup 200 is grabbed in a way that the gripper 36 is rotated at the least angle and/or shifted in a minimum distance.

From the above, when the gripper 36 grabs the stirrup 200, the gripper 34 is deviated from another end of the stirrup 200. Therefore, the gripper 34 does not interfere with another end of the stirrup 200, and the gripper 36 may smoothly grab the stirrup 200. In step S106, corresponding compensation information is loaded according to requirements.

Please refer to FIG. 1 and FIG. 3 at the same time. The system 100 for automatically collecting the stirrup further includes a compensation module 40 electrically connected to the control unit 10, wherein the compensation module 40 includes a compensation input interface 42 and a storage database 44. The storage database 44 of the compensation module 40 is configured to store compensation information, and the compensation information is entered into the storage database 44 via the compensation input interface 42 for storage.

Figure 7:
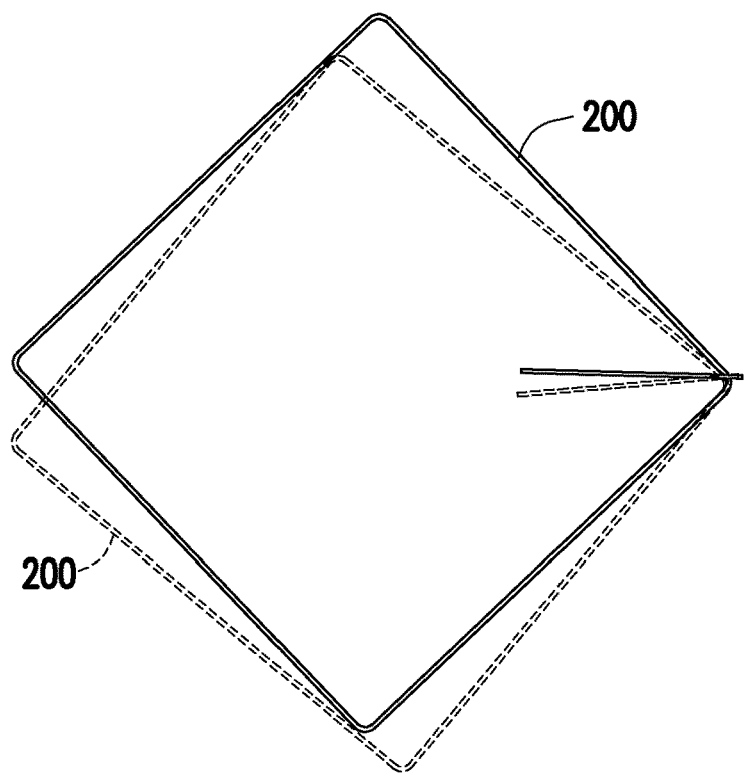
FIG. 7 is a schematic diagram of the final output pattern deflection of a stirrup.

As for a real manufacturing system, due to complex factors in the actual manufacturing process of the stirrup 200, such as: oil pressure and oil temperature, weather factors (such as air temperature), stirrup machine conveyor wheel wear, stirrup pattern self-weight, etc., the final output pattern may produce position errors, such as pattern deflection, as shown in FIG. 7, so that the robotic arm 30 may not readily pickup at the preset pickup position. Therefore, the above issues need to be corrected via compensation.

The system 100 for automatically collecting the stirrup of the present embodiment further includes the compensation module 40. The compensation module is configured to adjust the pickup point and the placement point determined by the system. Specifically, the compensation value is added to the pickup point and the placement point determined by the original decision, so that the recalculation of the pickup point and the placement point may overcome the pattern position error and the stirrup 200 may be picked and placed smoothly. When switching between different patterns and sizes in response to the work order information, the compensation information may be automatically loaded, and measurable environmental factors may also be automatically brought in. For example, the distance of the working surface, the position of the cutting knife, and the position and size of the interference items, etc. may be regularly measured; in this way, an appropriate pickup point may be calculated in response to the complex factors, as in step S107.

The compensation information includes a compensation amount, a compensation direction, an oil temperature, a weather state, a degree of wear of a conveyor wheel, a stirrup pattern self-weight, an assembly tolerance of the robotic arm 30, and the like.

After step S107, the placement target information is further entered into the control unit 10, wherein the placement target information includes a placement area origin and the size of the placement area R, so as to calculate the appropriate placement point.

In step S108, the placement point is calculated.

In step S109, the control unit 10 determines whether to shift the grippers for grabbing is need for the pickup point and/or the placement point.

Figure 8:
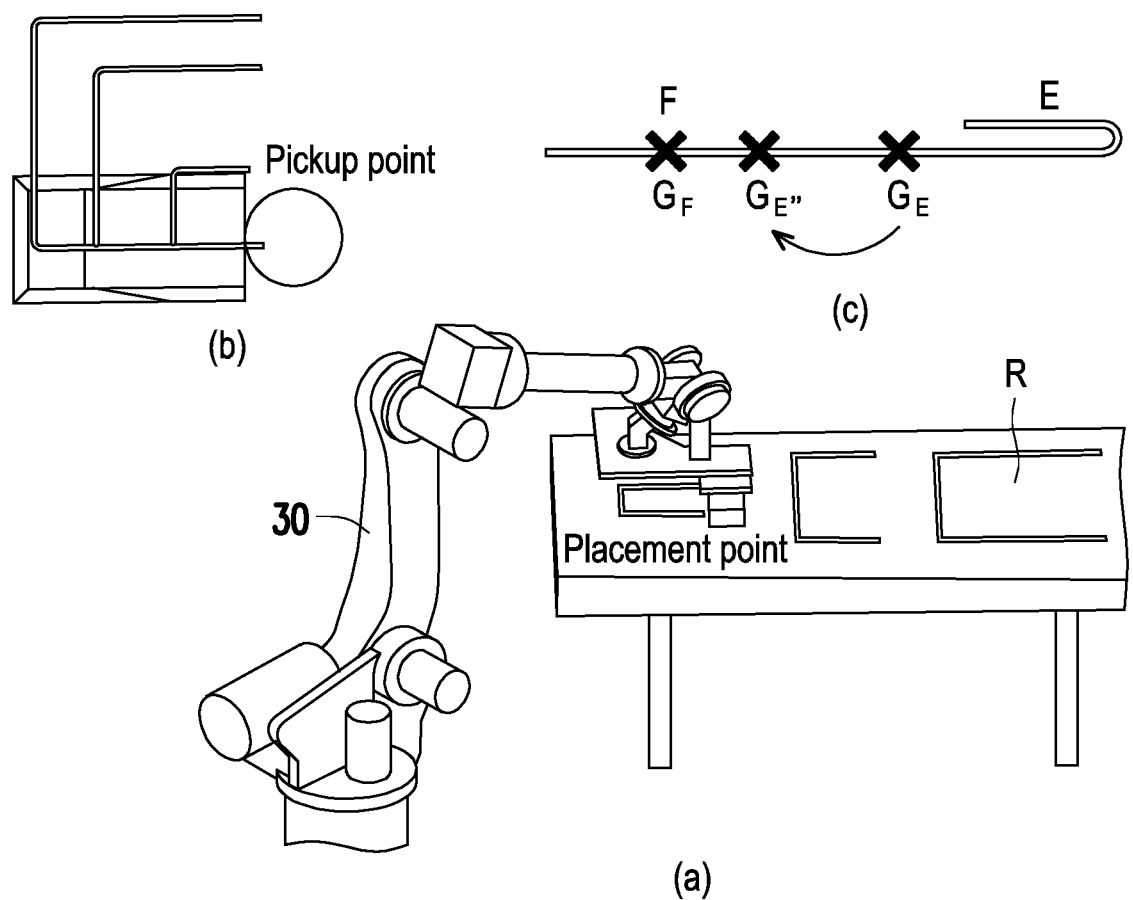
FIG. 8 is a schematic flow chart of the robotic arm places the grabbed stirrup to a placement point.

FIG. 8 is a schematic flow chart of the robotic arm places the grabbed stirrup to a placement point. Please refer to FIG. 2, FIG. 3, and FIG. 8 at the same time. In the present embodiment, the placement area R is a conveyor belt. If there are a plurality of solutions for the calculated placement point, comprehensively consider the interference between the segments and the limit of the movement of the robot arm, the pickup point with the minimum offset from the original standby posture of the gripper is taken, and the robotic arm 30 grabs and places the stirrup to a suitable placement point. (a) of FIG. 8 shows a back sideview of the robotic arm grabbing the stirrup. (b) of FIG. 8 shows the stirrup to be grabbed having different patterns and continuously variable sizes within a predetermined size range. (c) of FIG. 8 shows the situation that the robotic arm 30 may not place smoothly after grabbing because of a limitation. Therefore, a new pickup point needs to be selected. For example, the pickup point Gr in the F area (shown in (c) of FIG. 8) may not be grabbed smoothly due to the problem of segmental interference, while the pickup point $G_E$ in the E area (shown in (c) of FIG. 8) exceeds the limitation of the robotic arm resulted in that the robotic arm cannot reach it, wherein the pickup point $G_E$ is the solution that grabbing the pattern center of gravity G of the pattern is priority selected. So, a newly updated pickup point GE" (shown in (c) of FIG. 8), which the appropriate offset is added into the pickup point $G_E$, is selected as the gripping point.

The evaluation of the aforementioned offset which is added into the pickup point $G_E$ includes the aforementioned requirements (such as avoiding interference, using fewer grippers) and less differences between the coordinate values, etc.

Furthermore, one solution is that shifting and/or rotating the stirrup in order to grab and place the stirrup in the placement area R. Meanwhile, an offset corresponding to a newly determined pickup point GE" is stored in the storage database 44 (shown in FIG. 1), and at the same time, the newly pickup point of the pattern is updated, so that next time the updated pickup point may be used in conjunction with the placement point within the limitation of the robotic arm 30. This placement point feedback mechanism to update the pickup point may be used to deal with situations such as the limit of the robotic arm, interference in the placement area, and limited placement posture.

Specifically, in the step of evaluating the aforementioned offset, an offset of the pickup point is firstly taken into consideration, and an offset of the placement point is secondly taken into consideration. If there is a limitation due to the stirrup pattern is not matching the shape of the placement area, or due to the aforementioned update mechanism, which results in that the existing pickup point is difficult to make the stirrup being placed in a suitable position, a feedback update of the placement point will be performed to correct the offset of the placement point.

In some situation, even the pickup point has been updated and the placement point has been confirmed, due to deviations or other conditions during the grabbing process, the updated pickup point and the confirmed placement point may be corrected again by the system 10 for automatically collecting the stirrup.

Another situational use is where the stirrups are stacked into stacks within the placement area, resulting in a plurality of regular but distinct placement points needed for stacking, and the system for automatically collecting the stirrup of the present embodiment may also be utilized in such an implementation.

In step S110, after assessing various situations, the solution with the minimum offset is selected.

In step S111, an updated pickup point and a placement point are obtained.

In particular, in the present embodiment, the process of the robotic arm 30 grabbing the stirrup 200 from the pickup point and placing the stirrup 200 at the placement point is not performed via a visual recognition device. In other words, the system 100 for automatically collecting the stirrup is able to control the robotic arm 30 to perform picking, placing, collecting, sorting and stacking operations without being equipped with a visual recognition device.

To sum up, by providing the system and method for automatically collecting the stirrup provided in the disclosure, stirrups have the characteristics of diverse patterns according to the needs of clients, wherein each of the diverse patterns has a line formed by at least one segments while the at least one segments having no restrictions on angles, lengths or sizes, etc. Therefore, the shape and size of the stirrups have an infinite number of possible combinations. The existing clamps may usually grab stirrups with fixed shapes and specifications, and may not conform to the grabbing of stirrups having different shapes and different specifications. Moreover, because there are too many specifications of stirrups, it is difficult to build a robotic arm grabbing program corresponding to each specification for the stirrup of each pattern. Usually, a few representative products with high demand may be selected for automatic production, and most of the others still maintain manual production. In comparison, the system for automatically collecting the stirrup of the disclosure may automatically calculate and generate the corresponding positions of the pickup point and the placement point of the robotic arm in response to each work order information. In this way, the system for automatically collecting the stirrup of the disclosure may be adapted to the automatic production of different patterns having continuously variable sizes within a predetermined size range and without programming each shape and length of the stirrups individually.

In addition, it is also possible to avoid issues caused by misplacement by personnel or errors in work order delivery.

Moreover, the calculated pickup point and placement point may still be adjusted by manually adding compensation values or automatically loading compensation values from the storage database, and the memory is stored so as to be automatically inserted into other similar patterns.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A system for automatically collecting a stirrup, comprising:
   a control unit receiving work order information and automatically generating pickup point and placement point information of the stirrup according to the work order information;
   a stirrup device electrically connected to the control unit and receiving the work order information output by the control unit to shape the stirrup; and
   a robotic arm electrically connected to the control unit and receiving the pickup point and placement point information, wherein the control unit controls the robotic arm to grab the stirrup from a pickup point and place the stirrup at a placement point, wherein the work order information comprises a pattern of the stirrup, a length and an angle of each of a plurality of segments of the pattern, and a line of the pattern of the stirrup defined by the plurality of segments of the pattern of the stirrup, wherein the control unit further receives a grabbing information including a configuration of the robotic arm, wherein the control unit calculates a center of the line and a pattern center of gravity of the stirrup according to the work order information, and according to grabbing information, to generate the pickup point and placement point information.

2. The system for automatically collecting the stirrup of claim 1, wherein the control unit further receives placement target information, and calculates the placement point of the stirrup in a placement area based on the placement target information.

3. The system for automatically collecting the stirrup of claim 1, wherein the grabbing information further comprises a robotic arm size and a pickup origin.

4. The system for automatically collecting the stirrup of claim 1, further comprising a compensation module electrically connected to the control unit, wherein the compensation module comprises a compensation input interface and a storage database, and a compensation information is entered into the storage database via the compensation input interface for storage.

5. The system for automatically collecting the stirrup of claim 4, wherein when generating the pickup point and placement point information of the stirrup, the corresponding compensation information is automatically loaded from the storage database.

6. The system for automatically collecting the stirrup of claim 4, wherein the compensation information comprises a compensation amount, a compensation direction, an oil temperature, weather factors, stirrup machine conveyor wheel wear, a stirrup pattern self-weight, and an assembly tolerance of the robotic arm.

7. The system for automatically collecting the stirrup of claim 1, wherein the robotic arm comprises:
a gripper fixing plate having a first extending end and a second extending end, wherein the first extending end is extended toward a first direction and the second extending end is extended toward a second direction, and the first direction and the second direction are not parallel to each other; and
a plurality of grippers, wherein one of the plurality of grippers is disposed at the first extending end, and another of the plurality of grippers is disposed at the second extending end.

8. The system for automatically collecting the stirrup of claim 7, wherein the robotic arm further comprises at least one rotary mechanism connected to the gripper fixing plate and at least one of the plurality of grippers.

9. The system for automatically collecting the stirrup of claim 8, wherein the control unit controls at least one of the plurality of grippers of the robotic arm to be rotated driven by the at least one rotary mechanism according to the grabbing information.

10. The system for automatically collecting the stirrup of claim 7, wherein the robotic arm also comprises at least one linear moving mechanism connected to the gripper fixing plate and at least one of the plurality of grippers.

11. The system for automatically collecting the stirrup of claim 10, wherein the at least one linear moving mechanism comprises an electric cylinder or an air cylinder.

12. The system for automatically collecting the stirrup of claim 10, wherein the control unit controls at least one of the plurality of grippers of the robotic arm to be shift relative to another of the plurality of grippers driven by the at least one linear moving mechanism according to the grabbing information.

13. The system for automatically collecting the stirrup of claim 1, wherein a process of the robotic arm grabbing the stirrup from the pickup point and placing the stirrup at the placement point is not performed via a visual recognition device.

14. A method for automatically collecting a stirrup, comprising:
entering work order information configured to produce the stirrup, wherein the work order information comprises a pattern of the stirrup, a length and an angle of each of a plurality of segments of the pattern, and a line of the pattern of the stirrup defined by the plurality of segments of the pattern of the stirrup;
calculating a line center and a pattern center of gravity in the pattern of the stirrup according to the work order information to obtain a pickup point; and
controlling a robotic arm to grab the stirrup from the pickup point and placing the stirrup at a placement point,
wherein obtaining the pickup point comprises calculating a center of the line and a pattern center of gravity of the stirrup according to the work order information and according to a grabbing information including a configuration of the robotic arm, evaluating a position that the robotic arm grabbing the stirrup being close to the center of the line or close to the pattern center of gravity of the pattern.

15. The method for automatically collecting the stirrup of claim 14, further comprising evaluating a gripper quantity used by the robotic arm to grab the stirrup after evaluating according to the configuration of the robotic arm.

16. The method for automatically collecting the stirrup of claim 15, wherein the step of evaluating the gripper quantity used by the robotic arm to grab the stirrup comprises using a single gripper for grabbing according to a pattern weight of the stirrup.

17. The method for automatically collecting the stirrup of claim 15, wherein the step of evaluating the gripper quantity used by the robotic arm to grab the stirrup comprises determining whether using a single gripper for grabbing is interfered by other grippers according to the configuration of the robotic arm.

18. The method for automatically collecting the stirrup of claim 17, further comprising moving the single gripper to avoid an interference when it is determined that using the single gripper for grabbing is interfered by other grippers.

19. The method for automatically collecting the stirrup of claim 14, wherein the step of evaluating for grabbing the stirrup according to the configuration of the robotic arm further comprises calculating an offset of at least one gripper of the robotic arm.

20. The method for automatically collecting the stirrup of claim 14, further comprising, before the pickup point is obtained, entering compensation information to be calculated together with the work order information.

21. The method for automatically collecting the stirrup of claim 14, further comprising, after the pickup point is obtained and before the placement point is obtained, entering placement target information to calculate the placement point.

22. The method for automatically collecting the stirrup of claim 21, further comprising, after the step of calculating the placement point, determining whether an offset is needed for grabbing.

* * * * *